(12) United States Patent
Barker et al.

(10) Patent No.: US 11,047,250 B2
(45) Date of Patent: Jun. 29, 2021

(54) CMC BOAS TRANSVERSE HOOK ARRANGEMENT

(71) Applicant: United Technologies Corporation, Farmington, CT (US)

(72) Inventors: William M. Barker, North Andover, MA (US); Thomas E. Clark, Sanford, ME (US); Daniel J. Whitney, Topsham, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 157 days.

(21) Appl. No.: 16/376,210

(22) Filed: Apr. 5, 2019

(65) Prior Publication Data
US 2020/0318491 A1    Oct. 8, 2020

(51) Int. Cl.
*F01D 11/08* (2006.01)
*F01D 25/12* (2006.01)
*F01D 25/24* (2006.01)

(52) U.S. Cl.
CPC .............. *F01D 11/08* (2013.01); *F01D 25/12* (2013.01); *F01D 25/246* (2013.01); *F05D 2240/55* (2013.01); *F05D 2300/6033* (2013.01)

(58) Field of Classification Search
CPC ........ F01D 11/08; F01D 25/12; F01D 25/246; F05D 2240/55; F05D 2300/6033; F05D 2240/11
See application file for complete search history.

(56) References Cited

U.S. PATENT DOCUMENTS

| | | | | |
|---|---|---|---|---|
| 4,087,199 A * | 5/1978 | Hemsworth | ............ | F01D 11/08 415/173.3 |
| 7,434,670 B2 * | 10/2008 | Good | ........................ | F01D 9/04 188/380 |
| 8,246,299 B2 * | 8/2012 | Razzell | ................. | F01D 11/005 415/173.1 |
| 8,740,552 B2 * | 6/2014 | Marusko | ............... | F01D 11/122 415/173.1 |

(Continued)

FOREIGN PATENT DOCUMENTS

| | | |
|---|---|---|
| EP | 2604805 | 6/2013 |
| EP | 3115559 | 1/2017 |

(Continued)

OTHER PUBLICATIONS

The Extended European Search Report for EP Application No. 21677853 dated Jul. 15, 2020.

*Primary Examiner* — Justin D Seabe
*Assistant Examiner* — Theodore C Ribadeneyra
(74) *Attorney, Agent, or Firm* — Carlson, Gaskey & Olds, P.C.

(57) ABSTRACT

A blade outer air seal includes a base portion that extends between a first circumferential side and a second circumferential side and from a first axial side to a second axial side. A first wall is axially spaced from a second wall. The first and second walls extend from the base portion. The second wall has at least one wall window configured to engage with a support structure. An outer wall radially spaced from the base portion between the first and second walls. The outer wall has at least one outer wall window configured to engage with the support structure.

20 Claims, 5 Drawing Sheets

(56) References Cited

U.S. PATENT DOCUMENTS

| | | | |
|---|---|---|---|
| 8,834,105 B2 | 9/2014 | Albers et al. | |
| 8,905,709 B2 | 12/2014 | Dziech et al. | |
| 10,385,718 B2* | 8/2019 | O'Leary | F01D 11/24 |
| 10,753,220 B2* | 8/2020 | Clark | F01D 11/08 |
| 10,753,221 B2* | 8/2020 | Barker | F01D 11/08 |
| 10,801,351 B2* | 10/2020 | Rugg | F01D 25/12 |
| 2005/0111965 A1* | 5/2005 | Lowe | F01D 9/04 |
| | | | 415/116 |
| 2010/0068050 A1* | 3/2010 | Hansen | F01D 25/246 |
| | | | 415/209.3 |
| 2012/0057968 A1* | 3/2012 | Lee | F01D 11/08 |
| | | | 415/178 |
| 2012/0171027 A1 | 7/2012 | Albers | |
| 2012/0219401 A1* | 8/2012 | Rawlinson | F01D 9/06 |
| | | | 415/115 |
| 2013/0017058 A1* | 1/2013 | Joe | F01D 11/08 |
| | | | 415/1 |
| 2013/0156550 A1* | 6/2013 | Franks | F01D 25/246 |
| | | | 415/126 |
| 2014/0023490 A1* | 1/2014 | Hillier | F01D 11/005 |
| | | | 415/173.6 |
| 2014/0060081 A1* | 3/2014 | Earl | F01D 9/042 |
| | | | 60/805 |
| 2014/0241874 A1* | 8/2014 | Rioux | F01D 25/246 |
| | | | 415/209.4 |
| 2014/0271145 A1* | 9/2014 | Thomas | F01D 11/24 |
| | | | 415/173.1 |
| 2016/0123186 A1* | 5/2016 | Stover | F01D 11/24 |
| | | | 415/116 |
| 2016/0290144 A1* | 10/2016 | Roussille | F01D 9/04 |
| 2017/0198599 A1* | 7/2017 | Ryan | F02C 7/18 |
| 2018/0051590 A1* | 2/2018 | Tableau | F01D 11/08 |
| 2018/0149034 A1 | 5/2018 | Roussille et al. | |
| 2018/0156069 A1 | 6/2018 | Quennehen et al. | |
| 2020/0063592 A1* | 2/2020 | Barker | F01D 11/08 |

FOREIGN PATENT DOCUMENTS

| | | |
|---|---|---|
| EP | 3121387 | 1/2017 |
| EP | 3575558 | 12/2019 |
| WO | 20150088869 | 6/2015 |
| WO | 2015191186 | 12/2015 |

* cited by examiner

CMC BOAS TRANSVERSE HOOK ARRANGEMENT

BACKGROUND

This application relates to a ceramic matrix composite blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal includes a base portion that extends between a first circumferential side and a second circumferential side and from a first axial side to a second axial side. A first wall is axially spaced from a second wall. The first and second walls extend from the base portion. The second wall has at least one wall window configured to engage with a support structure. An outer wall radially spaced from the base portion between the first and second walls. The outer wall has at least one outer wall window configured to engage with the support structure.

In a further embodiment of any of the above, a slot extends through the first wall. The slot is configured to engage with a vane support structure.

In a further embodiment of any of the above, the base portion, first and second walls, and the outer wall form a circumferentially extending passage.

In a further embodiment of any of the above, at least one outer wall window has a width in a circumferential direction that is less than about 40% of a width of the base portion in the circumferential direction.

In a further embodiment of any of the above, a third wall and a fourth wall are between the first and second walls. The first and third walls are joined by the outer wall. The second and fourth walls are joined by a second outer wall.

In a further embodiment of any of the above, the base portion, the first wall, the third wall, and the outer wall form a first circumferentially extending passage. The base portion, the second wall, the fourth wall, and the second outer wall form a second circumferentially extending passage.

In a further embodiment of any of the above, the base portion extends axially beyond the first wall.

In a further embodiment of any of the above, the first wall, the second wall, and the outer wall have a same thickness.

In a further embodiment of any of the above, a film cooling hole extends through the base portion.

In a further embodiment of any of the above, the blade outer air seal is a ceramic matrix composite material.

In another exemplary embodiment, a turbine section for a gas turbine engine includes a turbine blade that extends radially outwardly to a radially outer tip and for rotation about an axis of rotation. A blade outer air seal has a plurality of segments mounted in a support structure. The plurality of segments are arranged circumferentially about the axis of rotation and radially outward of the outer tip. Each segment has a base portion that extends between a first circumferential side and a second circumferential side and from a first axial side to a second axial side. A first wall is axially spaced from a second wall. The first and second walls extend from the base portion. The second wall has at least one wall window engaged with a first hook on the support structure and an outer wall radially spaced from the base portion between the first and second walls. The outer wall has at least one outer wall window engaged with a second hook on the support structure.

In a further embodiment of any of the above, a slot extends through the first wall. A vane support structure extends through the slot.

In a further embodiment of any of the above, the first and second hooks extend in a same axial direction.

In a further embodiment of any of the above, the base portion, first and second walls, and the outer wall form a circumferentially extending passage. The first and second hooks extend into the passage.

In a further embodiment of any of the above, a third wall and a fourth wall are between the first and second walls. The first and third walls are joined by the outer wall to form a first circumferentially extending passage. The second and fourth walls are joined by a second outer wall to form a second circumferentially extending passage.

In a further embodiment of any of the above, the first hook extends into the second circumferentially extending passage. The second hook extends into the first circumferentially extending passage.

In a further embodiment of any of the above, the first wall, the second wall, and the outer wall have a same thickness.

In a further embodiment of any of the above, a wear liner is arranged between the first and second hooks and the segment.

In a further embodiment of any of the above, the wear liner is formed from a cobalt material.

In a further embodiment of any of the above, the blade outer air seal is a ceramic matrix composite material.

DETAILED DESCRIPTION

Figure 1:
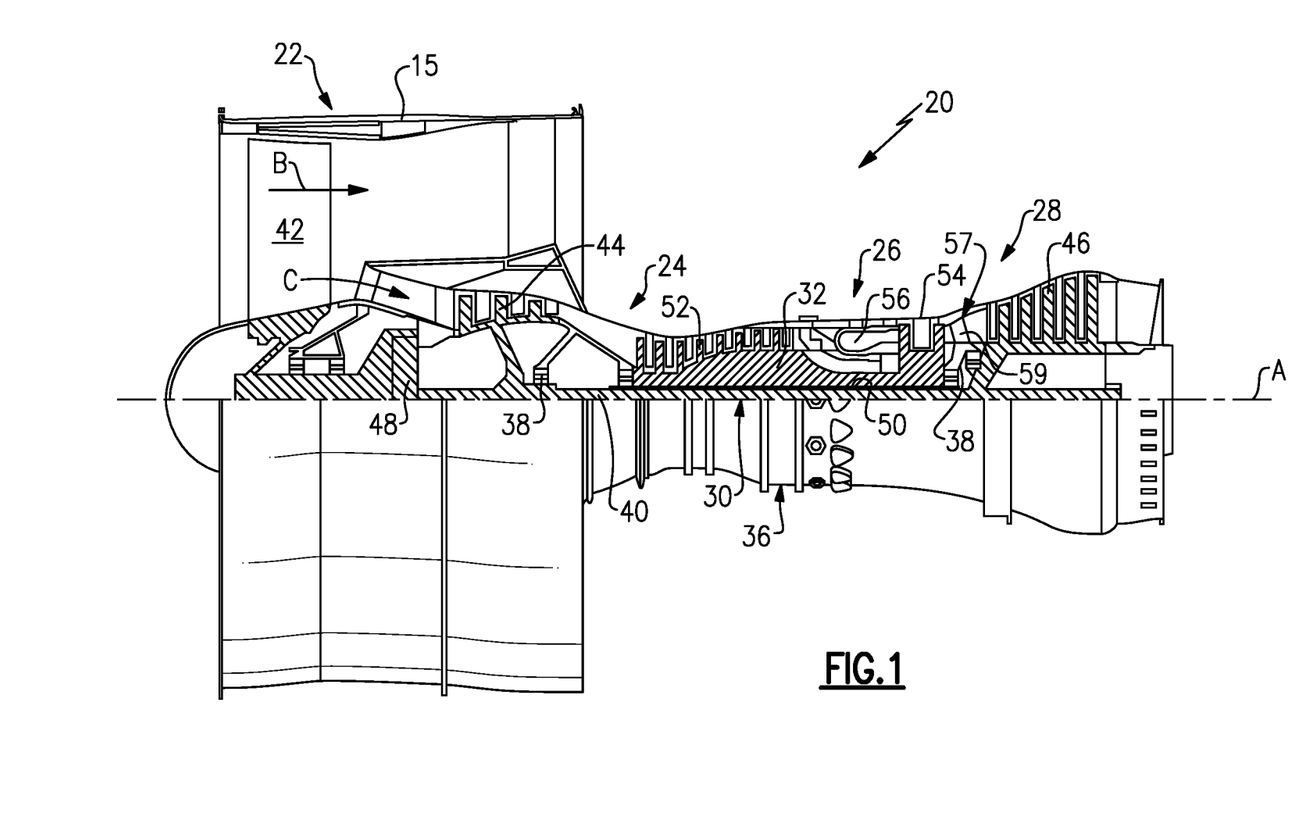
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
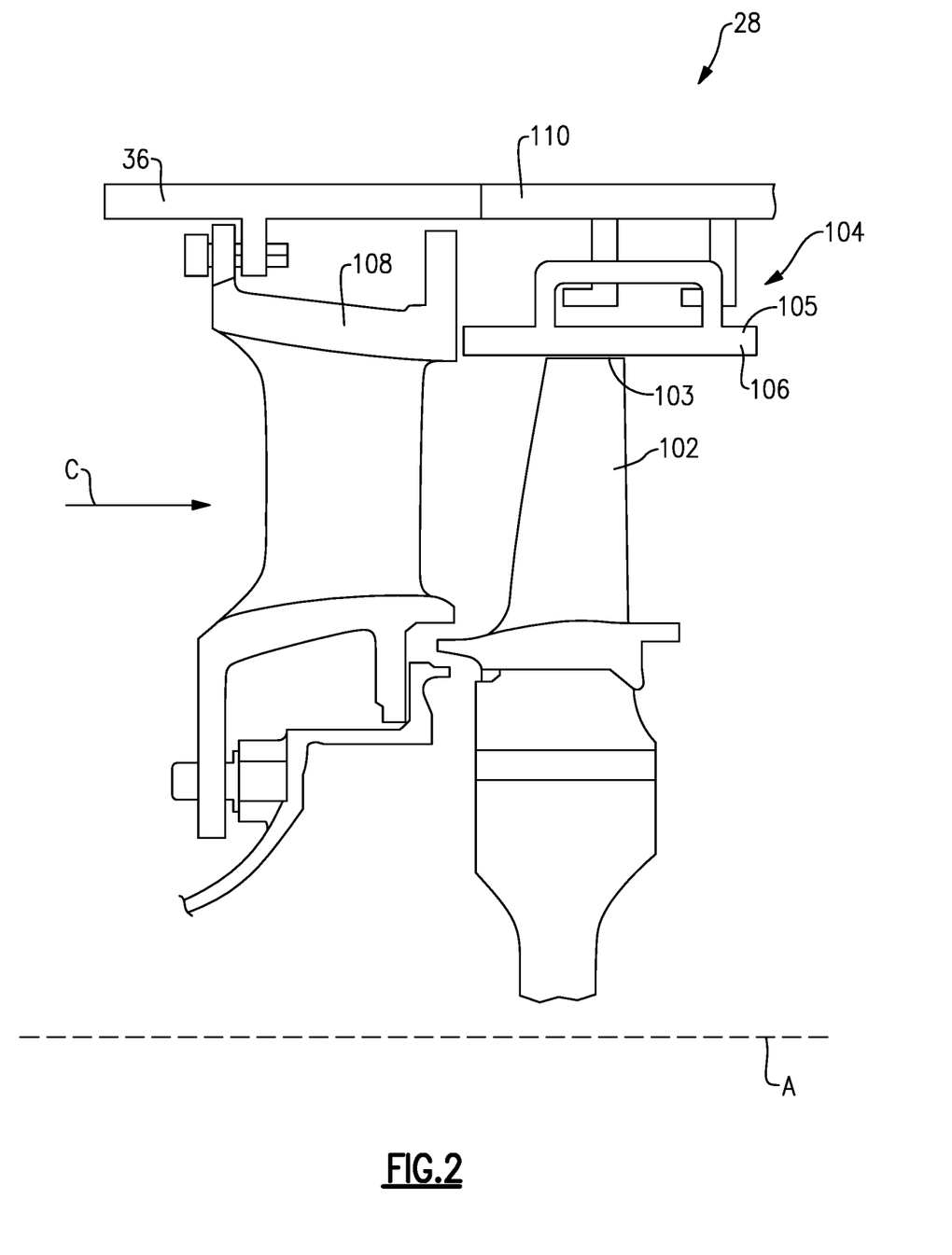
FIG. 2 shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The example turbine section 28 has a plurality of alternating turbine blades 102 and turbine vanes 108.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be bodies that are formed of a high thermal-resistance, low-toughness material, such as a ceramic matrix composite ("CMC").

The BOAS 106 may be mounted to an engine case or structure, such as engine static structure 36 via a control ring, intermediate carrier, or support structure 110. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
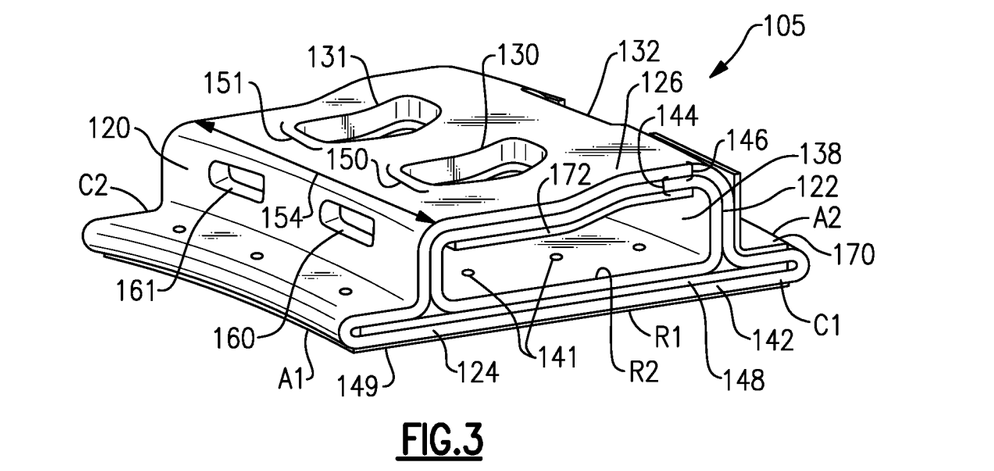
FIG. 3 shows an exemplary blade outer air seal.

FIG. 3 is an example BOAS segment 105. The seal segment 105 is a body that defines radially inner and outer sides R1, R2, respectively, first and second axial sides A1, A2, respectively, and first and second circumferential sides C1, C2, respectively. The first and second circumferential sides C1, C2 form matefaces that are configured to engage with the circumferential sides of an adjacent BOAS segment 105. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, the BOAS segment 105 includes a first axial wall 120 and a second axial wall 122 that extend radially outward from a base portion 124. The first and second axial walls 120, 122 are axially spaced from one another. Each of the first and second axial walls 120, 122 extends along the base portion 124 in a generally circumferential direction along at least a portion of the seal segment 105. The base portion 124 extends between the first and second axial sides A1, A2 and defines a gas path on a radially inner side and a non-gas path on a radially outer side. An outer wall 126 extends between the first and second axial walls 120, 122. The outer wall 126 includes a generally constant thickness and constant position in the radial direction. The base portion 124, first and second axial walls 120, 122, and the outer wall 126 form a passage 138 that extends in a generally circumferential direction. This is known as a "box" arrangement. In this disclosure, forward, aft, upstream, downstream, axial, radial, or circumferential is in relation to the engine axis A unless stated otherwise.

The base portion 124 may extend axially forward and aft of the first and second walls 120, 122, and provides a surface for sealing of the BOAS leading and trailing edges. For example, the base portion 124 includes a portion axially forward of the first axial wall 120 for engagement with seals. In some examples, an environmental barrier coating (EBC) 149 is arranged on the radially innermost surface R1 to protect the BOAS segment 105 from the gas path. The coating 149 may be an abradable coating, in some examples.

The BOAS segment 105 includes windows for engagement with the support structure 110. A pair of windows 130, 131 are arranged on the outer wall 126. The windows 130, 131 are at the same position in the axial direction. Although a pair of windows 130, 131 is shown, a single window, or additional windows may fall within the scope of this disclosure. A window 132 is arranged in the second wall 122. The windows 130, 131, 132 are configured to engage with the support structure 110. The windows 130, 131, 132 extend all the way through the outer wall 126 or second wall 122. In some examples, a pair of slots 160, 161 are arranged in the first wall 120, and configured to engage with a support structure for a vane 108.

The windows 130, 131, 132 permit direct mounting of the BOAS segment 105 onto the support structure 110 with or without an intermediate carrier. In some examples, wear liners 170, 172 are arranged on the BOAS segment 105 to protect the BOAS segment 105 and support structure 110. The wear liner 170 is arranged along an outer surface of the second wall 122. The wear liner 172 is arranged in the passage 138 surrounding the windows 130, 131. When the BOAS segment 105 is assembled onto the support structure 110, the wear liners 170, 172 will be arranged between the BOAS segment 105 and the support structure 110. The wear liners 170, 172 may be cobalt or another metallic material. The wear liners 170, 172 may be formed from sheet metal, for example.

In one example, the BOAS segment 105 has a length L in the circumferential direction, the first window 130 has a width 150, and the second window 131 has a width 151. A solidity ratio is defined as a ratio of the circumferential width of the hooks to the total circumferential width of the seal segment 105. In this example, the combination of widths 150 and 151 provides the circumferential width of the hooks. The BOAS segment 105 may have a solidity ratio of less than about 40%. In one example, the solidity is between about 10% and about 40%. The windows 130, 131 may have any shape, such as rectangular, trapezoidal, or rounded, to accommodate hooks of the support structure 110.

In some examples, a plurality of holes 141 extend through the base portion 124. The plurality of holes 141 provide film cooling to the first radial side R1. The holes 141 may be arranged within the passage 138 or on the platform forward or aft of the first and second walls 120, 122.

The BOAS 106 may be formed of a ceramic matrix composite ("CMC") material. Each seal segment 105 is formed of a plurality of CMC laminates 142. The laminates may be silicon carbide fibers, formed into a braided or woven fabric in each layer. The fibers may be coated by a boron nitride. In other examples, the BOAS 106 may be made of a monolithic ceramic.

CMC components such as BOAS segments 105 are formed by laying fiber material, such as laminate sheets, in tooling, injecting a liquid resin into the tooling, and curing to form a solid composite component. The component may be densified by adding additional material to further stiffen the laminates. Although a CMC BOAS segment 105 is described, other BOAS materials may fall within the scope of this disclosure.

In an embodiment, the BOAS segment 105 is formed from two loops of CMC laminated plies. A first loop 144 comprises the inner-most layers relative to the passage 138. A second loop 146 is formed about the first loop 144 to form the outermost layers relative to the passage 138. In one example embodiment, the first and second loops 144, 146 are each formed from four laminated plies 142. In some examples, the base portion 124 includes reinforcement plies 148 between the first and second loops 144, 146.

In an example embodiment, the BOAS segment 105 has a constant wall thickness of about 8 or 9 laminated plies, with each ply having a thickness of about 0.011 inches (0.279 mm). This structure may reduce thermal gradient stress. In other embodiments, the BOAS may be constructed of more or fewer plies. In one example, the first and second loops 144, 146 are formed from laminates wrapped around a core mandrel. In some embodiments, after the laminate plies 142 are formed into a seal segment 105, additional features, such as windows 130, 131, 132 are machined in to form mating surfaces and/or cooling holes. The seal segment 105 may be ultrasonically machined, for example.

Figure 4:
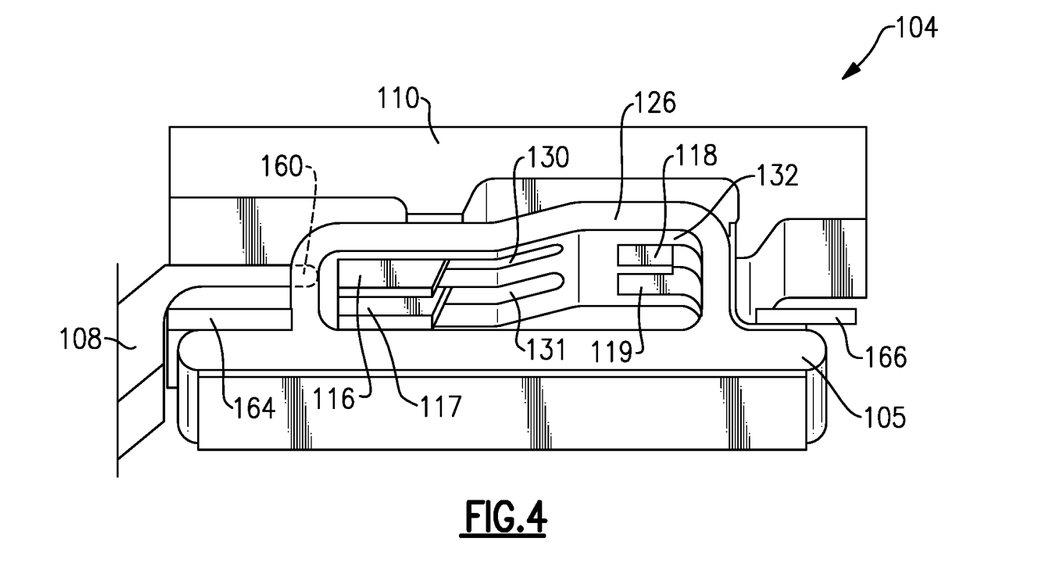
FIG. 4 shows a portion of an exemplary blade outer air seal assembly.

FIG. 4 shows a portion of an example BOAS assembly 104. The assembly 104 has a seal segment 105 with a support structure 110. The support structure 110 may be segmented, or a full ring structure. The support structure 110 has a plurality of hooks to secure the seal segment 105. A pair of first hooks 116, 117 is arranged axially forward of a pair of second hooks 118, 119. The pair of first hooks 116, 117 are arranged at the same position in the axial direction, and have the same shape. The pair of second hooks 118, 119 are arranged at the same position in the axial direction, and have the same shape. The first and second hooks 116, 117, 118, 119 extend radially inward from the support structure 110. The first and second hooks 116, 117, 118, 119 extend in the same radial direction. In this example, both the first and second hooks 116, 117, 118, 119 extend axially forward. In other embodiments, the first and second hooks 116, 117, 118, 119 may extend axially backwards.

The first hooks 116, 117 are inserted into the windows 130, 131, and are thus arranged within the passage 138. The second hooks 118, 119 are inserted into the window 132. Although pairs of hooks are shown, more or fewer hooks may be configured to engage with a single seal segment 105. In one example, the first hooks 116, 116 extend further radially inward than the second hooks 118, 119. The outer wall 126 varies in the radial direction to accommodate the differing hook positions in the radial direction. This arrangement facilitates assembly of the BOAS segment 105 onto the support structure 110.

In some examples, a portion of a vane 108 may be received in the slots 160, 161. Known arrangements have a large aft load on the vane 108. The slots 160, 161 permit the vane 108 to be supported by the support structure 110 to help distribute the load on the vane 108. The slots 160, 161 permit this load to be supported by the support structure 110, rather than the seal segment 105.

In some examples, a feather seal may be used for sealing between circumferential ends C1, C2 of adjacent seal segments 105. Brush seals 164, 166 may be used to seal the first and second axial sides A1, A2. The brush seals 164, 166 may be double axial brush seals, in some examples.

Figure 5:
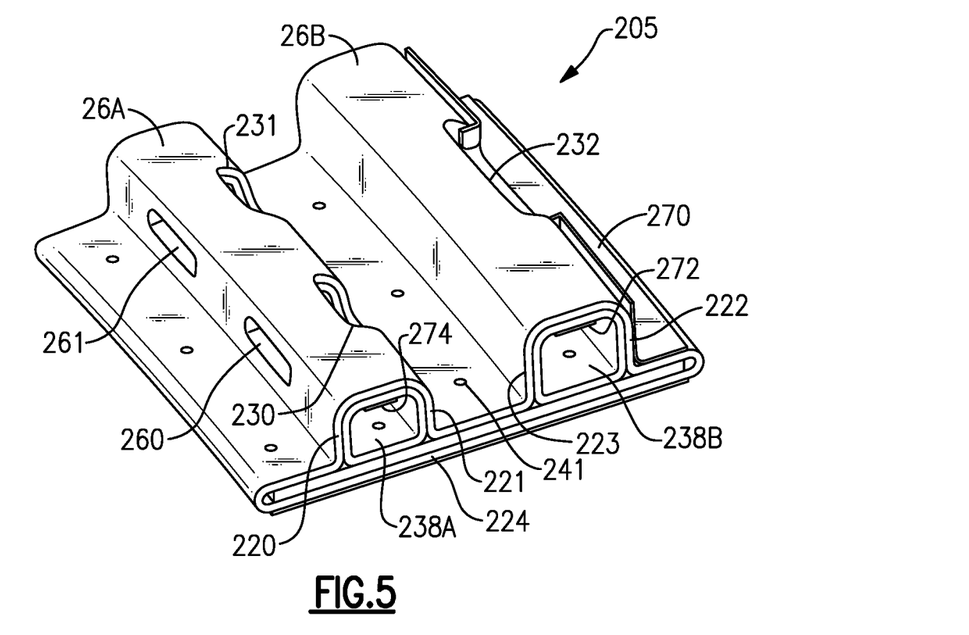
FIG. 5 shows a blade outer air seal according to another embodiment.

FIG. 5 illustrates another example BOAS segment 205. This example shows a "double box" arrangement. In this example, a third wall 221 is connected to the first wall 220 by a first outer wall 226A to form a first passage 238A. A fourth wall 223 is connected to the second wall 222 by a second outer wall 226B to form a second passage 238B. Part of the base portion 224 extends between the third and fourth walls 221, 223. The windows 230, 231 are arranged in the first outer wall 226A, and window 232 is arranged in the second wall 220. In some examples, film cooling holes 241 may be arranged in the passages 238A, 238B, forward or aft of the first and second walls 220, 222, or between the third and fourth walls 221, 223.

Figure 6:
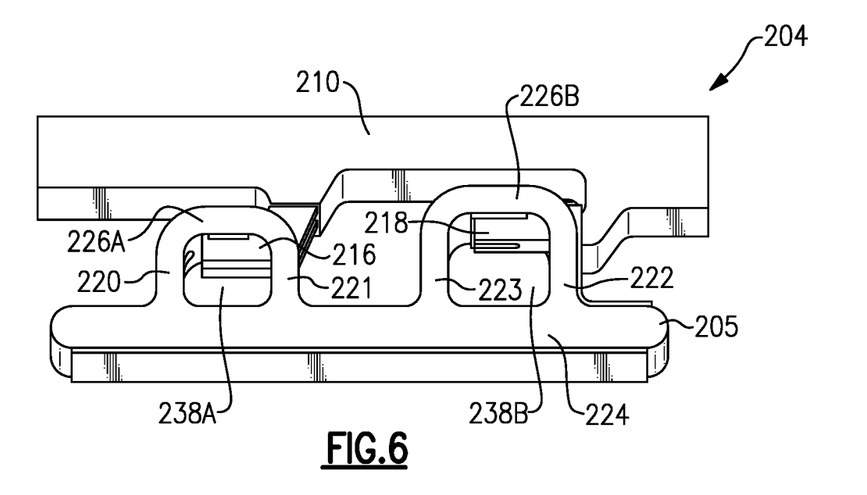
FIG. 6 shows a portion of an exemplary blade outer air seal assembly.

FIG. 6 shows a portion of an example BOAS assembly 204. The first hooks 216 of the support structure 210 will be received in the first passage 238A, while the second hooks 218 will be received in the second passage 238B. The hooks 216, 218 support the BOAS segment 205 in the radial direction and the axial direction. A wear liner 272, 274 may be arranged in each of the passages 238A, 238B. In some examples, the second passage 238B has a height in the radial direction that is greater than a height of the first passage 238A to facilitate assembly onto the support structure 210.

This double box arrangement permits greater flexibility of the BOAS segment 205 in the axial direction, while providing greater stiffness in the radial direction. This may help distribute stress on the part better than a single box structure. The double box arrangement may be formed using a pair of mandrels for wrapping laminate plies. The plies are oriented transverse to the hook loads.

Figure 7:
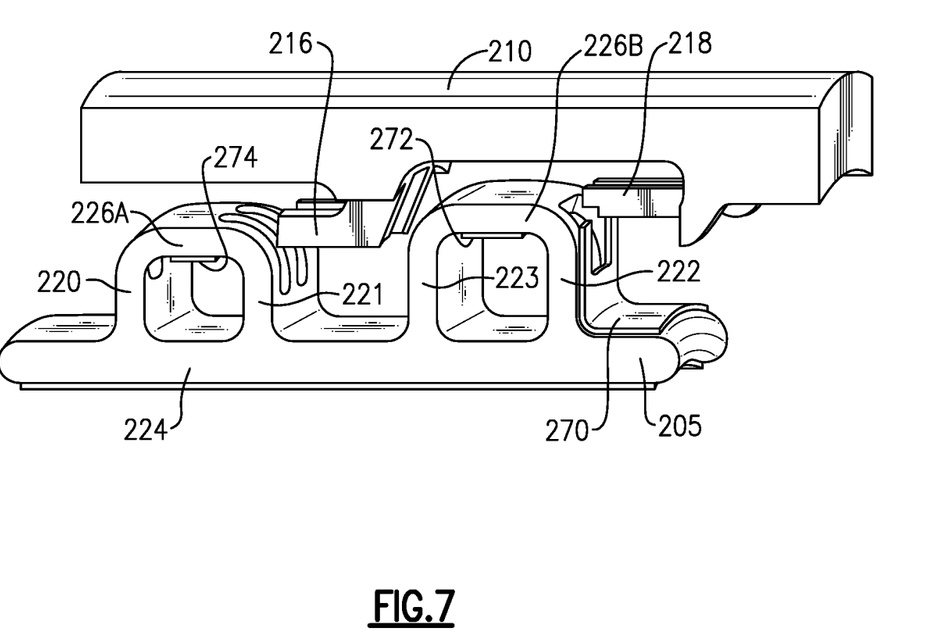
FIG. 7 shows a method step of assembling a blade outer air seal assembly.

FIG. 7 shows a method step of assembling a BOAS assembly 104. The seal segment 105 is assembled onto the support structure 110 in an axial direction by lining up the hooks 216, 218 with the windows 231, 232. The segment 205 is thus assembled first radially, and then axially. In some embodiments, wear liners 270, 272, 274 are arranged on the BOAS seal segment 205 before assembly onto the support structure 110. The wear liners 270, 272, 274 will thus be arranged between the seal segment 205 and the support structure 210 once assembled. Each seal segment 205 is mounted directly to the support structure 210 in this way.

Attaching CMC BOAS to outer structures can be challenging because thermal and pressure stresses can limit part life. The disclosed BOAS arrangement permits a CMC BOAS to be mounted directly to a support structure with or without an intermediate carrier.

In the double box embodiment, the two independent hook boxes allow the hook contact region to maintain transverse ply loading. This arrangement also allows the BOAS to have redundant hooks, which lowers failure risk and reduces hook and part stresses. The hook boxes also provide sealing surfaces and reduced CMC machining in the center section. Reduced machining is particularly important for CMC BOAS, because of the high costs of raw materials and machining.

This disclosure may be particularly helpful for the low pressure turbine section, because radial space for mounting a BOAS is limited. Known mounting technology requires a large amount of space in the radial direction to accommodate intermediate carriers, seals, plates, or other mounting features. The disclosed BOAS and support structure arrangement provides an efficient, simple, cost-effective, and structurally beneficial method for mounting a BOAS with a small profile in the radial direction. The disclosed BOAS may be formed with minimal machining, and provide easy assembly.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal, comprising:
a base portion extending between a first circumferential side and a second circumferential side and from a first axial side to a second axial side;
a first wall axially spaced from a second wall, the first and second walls extending from the base portion, the second wall having at least one wall window configured to engage with a support structure; and
an outer wall radially spaced from the base portion between the first and second walls, the outer wall having at least one outer wall window configured to engage with the support structure, and wherein the at least one wall window is arranged between the outer wall and the base portion.

2. The blade outer air seal of claim 1, wherein a slot extends through the first wall, the slot configured to engage with a vane support structure.

3. The blade outer air seal of claim 1, wherein the base portion, first and second walls, and the outer wall form a circumferentially extending passage.

4. The blade outer air seal of claim 3, wherein first and second hooks of the support structure are configured to extend into the circumferentially extending passage.

5. The blade outer air seal of claim 1, wherein the at least one outer wall window has a width in a circumferential direction that is less than 40% of a width of the base portion in the circumferential direction.

6. The blade outer air seal of claim 1, wherein the base portion extends axially beyond the first wall.

7. The blade outer air seal of claim 1, wherein the first wall, the second wall, and the outer wall have a same thickness.

8. The blade outer air seal of claim 1, wherein a film cooling hole extends through the base portion.

9. The blade outer air seal of claim 1, wherein the blade outer air seal is a ceramic matrix composite material.

10. A blade outer air seal, comprising:
a base portion extending between a first circumferential side and a second circumferential side and from a first axial side to a second axial side;
a first wall axially spaced from a second wall, the first and second walls extending from the base portion, the second wall having at least one wall window configured to engage with a support structure, and a third wall and a fourth wall between the first and second walls; and an outer wall radially spaced from the base portion between the first and second walls, the outer wall having at least one outer wall window configured to engage with the support structure, the first and third walls joined by the outer wall, and the second and fourth walls joined by a second outer wall.

11. The blade outer air seal of claim 10, wherein the base portion, the first wall, the third wall, and the outer wall form a first circumferentially extending passage, and the base portion, the second wall, the fourth wall, and the second outer wall form a second circumferentially extending passage.

12. The blade outer air seal of claim 10, wherein the blade outer air seal is a ceramic matrix composite material.

13. A turbine section for a gas turbine engine, comprising:
a turbine blade extending radially outwardly to a radially outer tip and for rotation about an axis of rotation;
a blade outer air seal having a plurality of segments mounted in a support structure, the plurality of segments arranged circumferentially about the axis of rotation and radially outward of the outer tip; and
wherein each segment has a base portion extending between a first circumferential side and a second circumferential side and from a first axial side to a second axial side, a first wall axially spaced from a second wall, the first and second walls extending from the base portion, the second wall having at least one wall window engaged with a first hook on the support structure and an outer wall radially spaced from the base portion between the first and second walls, the outer wall having at least one outer wall window engaged with a second hook on the support structure, and a third wall and a fourth wall between the first and second walls, the first and third walls joined by the outer wall to form a first circumferentially extending passage, and the second and fourth walls joined by a second outer wall to form a second circumferentially extending passage.

14. The turbine section of claim 13, wherein a slot extends through the first wall, and a vane support structure extends through the slot.

15. The turbine section of claim 13, wherein the first and second hooks extend in a same axial direction.

16. The turbine section of claim 13, wherein the first hook extends into the second circumferentially extending passage and the second hook extends into the first circumferentially extending passage.

17. The turbine section of claim 13, wherein the first wall, the second wall, and the outer wall have a same thickness.

18. The turbine section of claim 13, wherein a wear liner is arranged between the first and second hooks and the segment.

19. The turbine section of claim 18, wherein the wear liner is formed from a cobalt material.

20. The turbine section of claim 13, wherein the blade outer air seal is a ceramic matrix composite material.

* * * * *